(12) United States Patent
Basler et al.

(10) Patent No.: US 8,458,419 B2
(45) Date of Patent: Jun. 4, 2013

(54) METHOD FOR APPLICATION BACKUP IN THE VMWARE CONSOLIDATED BACKUP FRAMEWORK

(75) Inventors: Jason Ferris Basler, Los Gatos, CA (US); David George Derk, Gibsonia, PA (US); James Patrick Smith, Redwood City, CA (US)

(73) Assignee: International Business Machines Corporation, Armonk, NY (US)

( * ) Notice: Subject to any disclaimer, the term of this patent is extended or adjusted under 35 U.S.C. 154(b) by 760 days.

(21) Appl. No.: 12/038,449

(22) Filed: Feb. 27, 2008

(65) Prior Publication Data

US 2009/0216816 A1  Aug. 27, 2009

(51) Int. Cl.
*G06F 12/00* (2006.01)
*G06F 13/00* (2006.01)
*G06F 13/28* (2006.01)

(52) U.S. Cl.
USPC .......................................... 711/162; 711/161

(58) Field of Classification Search
USPC ................................................ 711/161–162
See application file for complete search history.

(56) References Cited

U.S. PATENT DOCUMENTS

| | | | |
|---|---|---|---|
| 7,606,868 B1* | 10/2009 | Le et al. | 709/211 |
| 2005/0198303 A1* | 9/2005 | Knauerhase et al. | 709/227 |
| 2007/0067586 A1* | 3/2007 | Mikami | 711/162 |
| 2007/0244938 A1* | 10/2007 | Michael et al. | 707/204 |
| 2009/0216970 A1* | 8/2009 | Basler et al. | 711/162 |

* cited by examiner

*Primary Examiner* — Yaima Campos
(74) *Attorney, Agent, or Firm* — Century IP Group, Inc.; F. Jason Far-hadian, Esq.

(57) ABSTRACT

Systems and methods for backing up applications executing on a virtual machine are provided. The method comprises submitting a first notification to a remote computing system to prepare an application running on a virtual machine for backup, such that application data consistency is maintained during the backup process; receiving a second notification from the remote computing system, indicating that the application is prepared for backup; creating a snapshot of the virtual machine in response to the second notification; and receiving application data from the computing system to process the snapshot and complete an application-specific backup for the virtual machine.

14 Claims, 7 Drawing Sheets

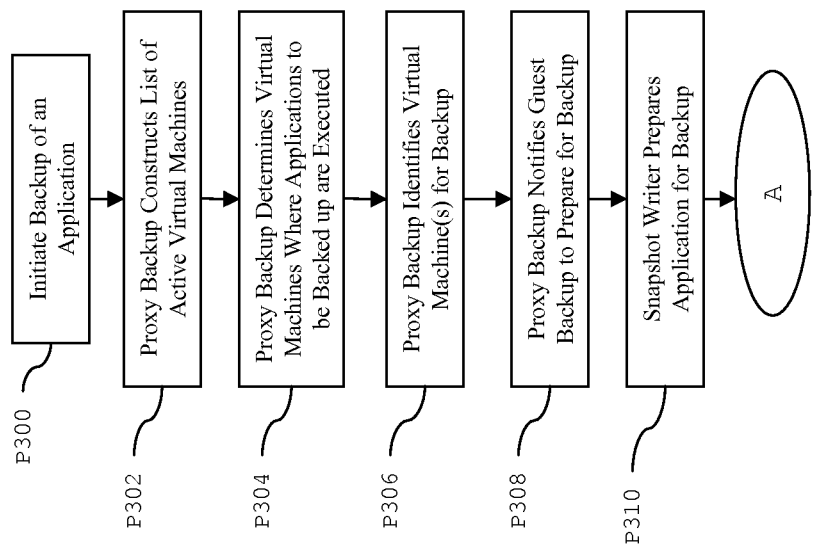

METHOD FOR APPLICATION BACKUP IN THE VMWARE CONSOLIDATED BACKUP FRAMEWORK

COPYRIGHT & TRADEMARK NOTICES

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of this invention to material associated with such marks.

TECHNICAL FIELD

The present invention relates generally to virtual machines and, more particularly, to methods, systems and computer products for backing up applications executing on a virtual machine.

BACKGROUND

Virtualization is the abstraction of computer resources and creation of a virtual version of something such as an operating system, a server, a storage device or network resources. Server virtualization is the abstraction of server resources (including the number and identity of individual physical servers, processors, and operating systems) and is used by many businesses and large organizations to reduce the costs of having individual physical servers (such as corporate web servers, print servers, databases, etc.).

Server virtualization helps to eliminate server sprawl, makes more efficient use of server resources, and centralizes server administration. A short-term server failure can cost an enterprise more in lost revenues than the cost associated with purchasing and installing the server. Therefore, the ability to backup virtual machines and move data from one virtual machine to another machine (i.e., another virtual machine or a physical machine) is critically important.

A server administrator may use a software application, often provided by an outside vendor, to create virtual machines (VMs) by dividing a physical server (host machine) into multiple isolated virtual environments (guests). Many vendors offer enterprise-level virtualization products such as the VMware® ESX Server, which allow multiple operating system environments to co-exist on the same computing system (VMware is a registered trademark of VMware, Inc.).

These virtualization products often provide a framework for backup of virtual machines from one or more virtualization servers at a central point known as a backup proxy (e.g., VMware has a capability known as VMware Consolidated Backup (VCB) for this purpose). The backup framework provides virtual disk snapshot and remote snapshot mounting capabilities, but the data movement and storage of the backup data is left to a third-party implementation that is often supported by backup products provided by other vendors.

Current backup frameworks have many shortcomings associated with managing backup data for software applications (e.g., database, mail, etc) running in the virtual machines. Server administrators normally use third-party backup products to initiate or modify the backup process for each application. Third-party backup products, such as the International Business Machines (IBM®) Tivoli® Storage Manager product, provide specialized data protection products which handle the backup for specific applications (IBM and Tivoli are registered trademarks of IBM).

However, when these specific applications are executed over a virtual machine, current backup frameworks do not provide any mechanism for the third-party backup products to automatically interact with the applications during backup. Instead, a server administrator is required to run scripts inside the virtual machines before and after taking a snapshot of the virtual disks to facilitate such interaction manually.

Furthermore, in the current systems, the backup framework is not provided with any information on application to data mapping or the identity of applications that are running on each virtual machine. Therefore, the server administrator must track this information and manually prepare the required scripts on each virtual machine to stop and restart the execution of each application, respectively before and after each snapshot is taken. As such, applications must be brought offline (e.g., placed in a frozen or saved state) before the backup process is initiated in order to achieve application data consistency.

Microsoft's® Volume Shadow Copy Service (VSS) provides an alternative to the above-noted backup frameworks by allowing the possibility to backup specific applications by tracking the files that are to be backed up and the volumes that are to be frozen, and by notifying each application running on the virtual machine to prepare itself for backup before a snapshot of the virtual machine is taken. Unfortunately, however, the VSS system substantially increases the load on the host server since all the work for preparation and taking the backup is performed by the host server. Moreover, while VSS may be configured to indicate where the virtual disk snapshot images reside, it still cannot be used in conjunction with the VCB backup proxy.

Methods and systems are needed that can overcome the aforementioned shortcomings.

SUMMARY

The present disclosure is directed to systems, methods and corresponding products that facilitate backing up applications executing on a virtual machine.

For purposes of summarizing, certain aspects, advantages, and novel features of the invention have been described herein. It is to be understood that not all such advantages may be achieved in accordance with any one particular embodiment of the invention. Thus, the invention may be embodied or carried out in a manner that achieves or optimizes one advantage or group of advantages without achieving all advantages as may be taught or suggested herein.

In accordance with one embodiment, a method for backing up an application comprises submitting a first notification to a remote computing system to prepare an application running on a virtual machine for backup, such that application data consistency is maintained during the backup process; receiving a second notification from the remote computing system, indicating that the application is prepared for backup; creating a snapshot of the virtual machine in response to the second notification; and receiving application data from the computing system to process the snapshot and complete an application-specific backup for the virtual machine. In one implementation, application data is mapped to one or more volumes.

In accordance with another embodiment, a method of backing up one or more applications executing on a virtual machine, comprises preparing an application for backup in response to a first notification from a first system communicatively coupled to a second system on which one or more virtual machines are running. The first system identifies a first virtual machine executing the application and provides the first notification to the first virtual machine to prepare the application for backup, such that application data consistency is maintained during the backup process.

The method may further comprise providing a second notification from the second system to the first system, indicating that the application is prepared for backup, wherein the first system creates a snapshot of the first virtual machine in response to the second notification; and communicating the application data to the first system, wherein the first system utilizes the application data to process the snapshot and complete an application-specific backup for the first virtual machine.

In accordance with one aspect of the invention, a system comprising one or more logic units is provided. The one or more logic units are configured to perform the functions and operations associated with the above-disclosed methods. In yet another embodiment, a computer program product comprising a computer useable medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The invention is not, however, limited to any particular embodiment disclosed.

BRIEF DESCRIPTION OF THE DRAWINGS

Embodiments of the present invention are understood by referring to the figures in the attached drawings, as provided below.

FIGS. 3A through 3C are flow diagrams for an exemplary backup method in accordance with one embodiment.

Features, elements, and aspects of the invention that are referenced by the same numerals in different figures represent the same, equivalent, or similar features, elements, or aspects, in accordance with one or more embodiments.

DETAILED DESCRIPTION OF EXEMPLARY EMBODIMENTS

The present disclosure is directed to systems and corresponding methods that facilitate backing up applications executing on a virtual machine.

In the following, numerous specific details are set forth to provide a thorough description of various embodiments of the invention. Certain embodiments of the invention may be practiced without these specific details or with some variations in detail. In some instances, certain features are described in less detail so as not to obscure other aspects of the invention. The level of detail associated with each of the elements or features should not be construed to qualify the novelty or importance of one feature over the others.

Figure 1:
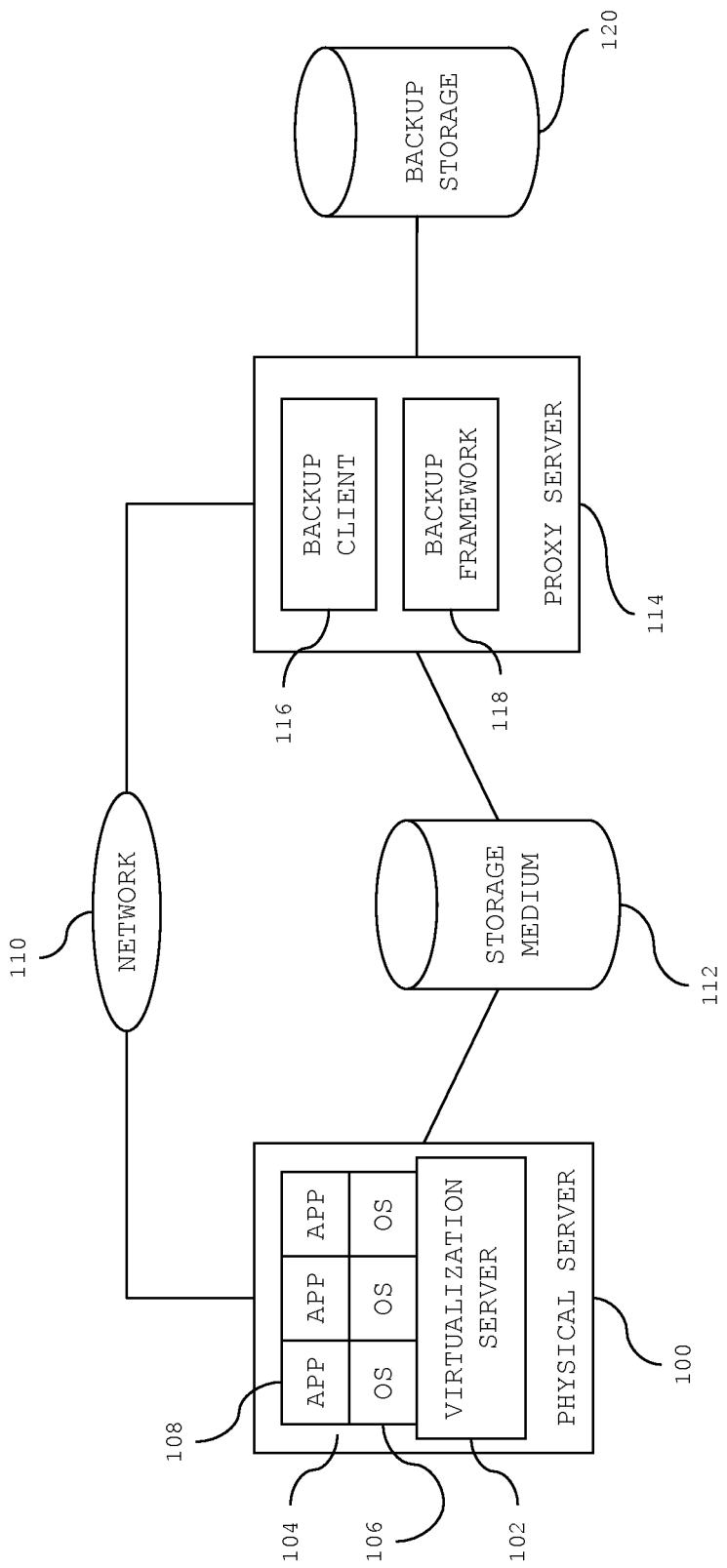
FIG. 1 illustrates an operating environment in which virtual machines on a virtualization server may be backed up using a proxy backup in accordance with one embodiment.

Referring to FIG. 1, a virtualization server 102 may be executed on a physical server 100. The virtualization server 102 may be executed on top of an operating system (OS) running on the physical server 100. The virtualization server 102 (e.g., VMWare ESX Server) may be provided by a third-party vendor. One or more virtual machines 104 may run on the virtualization server 102 and with guest operating systems 106 and applications 108 executing on top of the virtual machines 104. In an exemplary embodiment, the virtualization server 102 may be configured for storing virtual machine 104 disk images and creating snapshots of virtual machines 104.

The virtualization server 102 may communicate with a proxy server 114 over a communications network 110. The network 110 may comprise a local area network (LAN), wide area network (WAN), in a distributed or non-distributed environment. The virtualization server 102 and proxy server 114 may also communicate with a storage medium 112. A backup client 116 and a backup framework 118 may execute on the proxy server 114. In an exemplary embodiment, the backup client 116 may comprise a storage management software program (e.g., IBM's Tivoli Storage Manager, etc.) installed on the proxy server 114.

In an exemplary embodiment, the backup framework 118 (e.g., VMWare Consolidated Backup, etc.) may be configured to take snapshots of virtual machines 104 and the respective application data. The proxy server 114 is configured to support backup client 116 and backup framework 118 and also communicate with a backup storage 120 (e.g., a tape library, a storage area network (SAN), etc.) for the purpose of storing the backup data and snapshots of the virtual systems and the respective applications or data being executed on one or more virtual machines 106.

Figure 2:
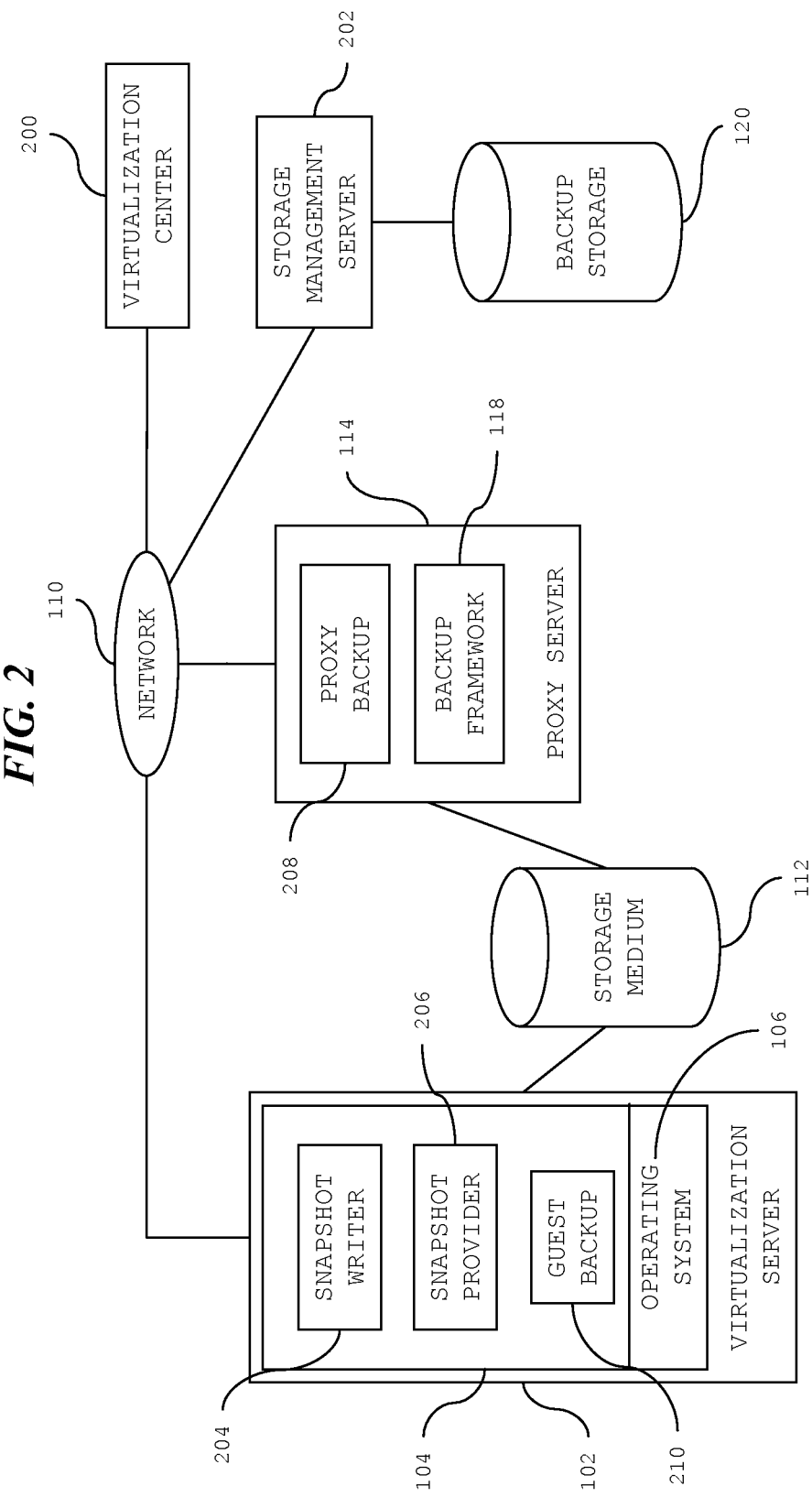
FIG. 2 illustrates an exemplary operating environment in accordance with one or more embodiments in which virtual machines on virtualization server may be backed up by integrating application snapshot capabilities with a proxy backup framework.

Referring now to FIGS. 1 and 2, to reduce the processing load on the proxy server 114, backup client 116 may be installed desirably as separate modules on the proxy server 114 (i.e., shown as proxy backup 208 in FIG. 2) and on each virtual machine 104 (i.e., shown as guest backup 210 in FIG. 2). The guest backup modules 210 on each virtual machine 104 may communicate among each other and possibly with the proxy backup 208 using a client-to-client communication protocol. The backup clients 116 may also be configured to communicate with a virtualization center 200 and a storage management server 202.

In an exemplary embodiment, the virtualization center 200 may comprise a server that maintains information about the physical servers 100 and virtual machines 104 coupled to network 110. The virtual machines 104 may include a snapshot framework utility (e.g., Microsoft's VSS, etc.) providing snapshot capabilities for backing up application data within the virtual machine execution environment. The snapshot frame work utility may comprise a snapshot writer 204 and a snapshot provider 206. The snapshot writer 204 prepares the application 108 for backup; and the snapshot provider 206 may create a snapshot of the application, or facilitate the creation of the snapshot by another component such as the virtualization server 102, the backup framework 118, or the storage medium 112.

Figure 3B:
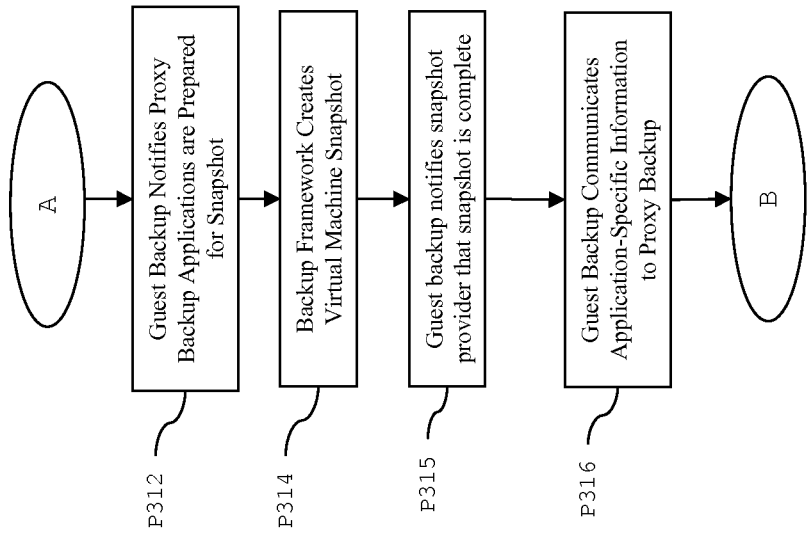
Figure 3C:
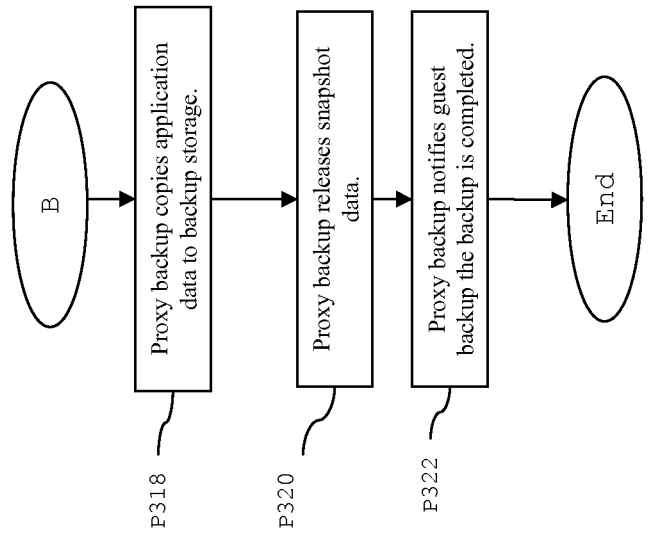

Referring now to FIG. 3, in an exemplary embodiment, the proxy backup 208 may initiate a backup process to store data associated with applications 108 (P300). The proxy backup 208 may initiate the backup in response to user interaction with a backup system or as a result of a prescheduled backup process. In one embodiment, the proxy backup 208 may be configured to allow a server administrator to select one or more specific applications 108 for backup. In another embodiment, the proxy backup 208 may simply initiate a backup of all applications 108.

In an exemplary implementation, the proxy backup 208 may construct a list of active virtual machines 104 in a network 110 (P302). The proxy backup 208 may query the virtualization center 200 to obtain information regarding the virtual machines 104 across the network 110. In accordance with one or more embodiments, the proxy backup 208 detects the active virtual machines 104 over which applications 108 designated for backup are executed (P304).

The proxy backup 208 may communicate with a guest backup 210 on each active virtual machine 104 to discover which applications 108 are running on the virtual machine 104. The virtual machines 104 for backup may be identified by polling active virtual machines 104 and discovering which virtual machines 104 are running the application to be backed up. Accordingly, the proxy backup 208 may identify one or more applications 108 or one or more virtual machines 104 for backup (P306).

For each virtual machine 104 identified by the proxy backup 208, the proxy backup 208 notifies the guest backup 210 on each virtual machine 104 to, for example, prepare a designated virtual machine 104 for backup (P308). In an exemplary embodiment, the guest backup 210 may notify the snapshot writer 204 to prepare an application 108 for backup (P310). The snapshot writer 204 is configured to manage application data in a consistent state by, for example, placing the application in a temporary halt state (i.e., by blocking or terminating operations that would alter the application data e.g., write operations, queuing I/O operations, committing pending operations to disk, etc.), preferably without terminating the application, until a snapshot is taken.

The snapshot writer 204 may signal the snapshot provider 206 and guest backup 210 that the application 108 is prepared for backup. In an exemplary embodiment, the snapshot provider 206 is configured not to create a snapshot so that the process of taking a snapshot is deferred to another system component as provided in further detail below to save system resources at physical server 100. In another embodiment, the snapshot provider 206 is configured to take a snapshot of the application data and the related attributes associated with the state of the virtual machine.

The guest backup 210 may communicate and notify the proxy backup 208 that the applications 108 are ready for backup (P312). The proxy backup 208 may communicate and notify the backup framework 118 to create a snapshot of the related application data and virtual machine 104 (P314). In accordance with one embodiment, the backup framework 118 may be configured to communicate with the virtualization server 102 to initiate a snapshot and create a virtual disk image of the virtual machines 104. The snapshot provider 206 may wait and allow the backup framework 118 to create a snapshot of the virtual machine 104.

As such, by using the backup framework 118 instead of the snapshot provider 206, the process of creating a snapshot may be offloaded and performed without consuming processing recourses of the physical server 100. The guest backup 210 may determine the files and volumes that may be included in the backup and provide this information to the proxy backup 208. The backup framework 118 may be modified to receive this information from the proxy backup 208 to reduce the number of snapshot volumes, for example, as opposed to blindly taking a snapshot of all volumes used by a virtual machine 104.

The backup framework 118 may mount the virtual disk snapshot from the storage medium 112 to the proxy server 114, such that the proxy backup 208 client may read from the snapshot virtual disk as if it were a local disk, for example. In some implementations, the proxy backup 208 may communicate with the guest backup 210 to indicate the backup framework 118 has completed the snapshot. And, the guest backup 210 may notify the snapshot provider 206 that the snapshot has been completed (P315). The snapshot provider 206 may signal the snapshot writer 204 to allow the applications 108 to resume processing and normal operation.

The guest backup 210 may communicate application-specific information (e.g., a list of files and volumes associated with the applications 108) to the proxy backup 208 (P316). The snapshot writer 204 may provide application-specific information to the guest backup 210. The proxy backup 208 client may communicate with a storage management server 202 to backup the snapshot virtual disk data to backup storage 120 (P318). In one embodiment, the proxy backup 208 may transmit or release the snapshot data to the storage management server 202 (P320). Thereby, the backup processing from the proxy server 114 is offloaded to the storage management server 202. Proxy backup 208 may then notify the guest backup 210 that the backup is completed (P322).

In one embodiment, the data may be moved from the proxy server 114 to the storage management server 202, for example, using the same or a similar method used for moving data from the virtualization server 102 to the proxy server 114 as disclosed herein in association with snapshot frameworks. In another embodiment, the proxy backup 208 client may manage the mounted snapshot as a local disk, for example, for backup purposes. The proxy backup 208 client may notify the backup framework 118 to dismount and remove the virtual disk file snapshots from the storage medium 112.

The exemplary backup methods and systems disclosed above improve the existing systems by combining a proxy backup framework 118 and an application 108 snapshot framework. Integrating the backup framework 118 with the application 108 snapshot framework allows on-line backups, eliminating any requirement to temporarily stop the running applications or to implement user-defined scripts. Thus, advantageously, application 108 backups are offloaded to the proxy server 114 or storage management server 202 keeping physical server 100 resources free from the additional load.

In one exemplary embodiment, application-specific information may be maintained to utilize application-specific data protection features that may be provided by a backup client 116. The virtual machine's 104 storage management at the application level provides the same granular restore scenarios within virtual machines 104 as are offered with applications running on physical hosts 100. Backup clients 116 may be configured to restore applications 108 and the related data.

In different embodiments, the invention can be implemented either entirely in the form of hardware or entirely in the form of software, or a combination of both hardware and software elements. For example, a physical server 100, virtualization server 102, proxy server 114, backup server 202, virtualization center 200, and backup clients 116, 208, 210, applications 108, and snapshot frameworks 118, 204, 206 may comprise a controlled computing system environment that can be presented largely in terms of hardware components and software code executed to perform processes that achieve the results contemplated by the system of the present invention.

Figure 4:
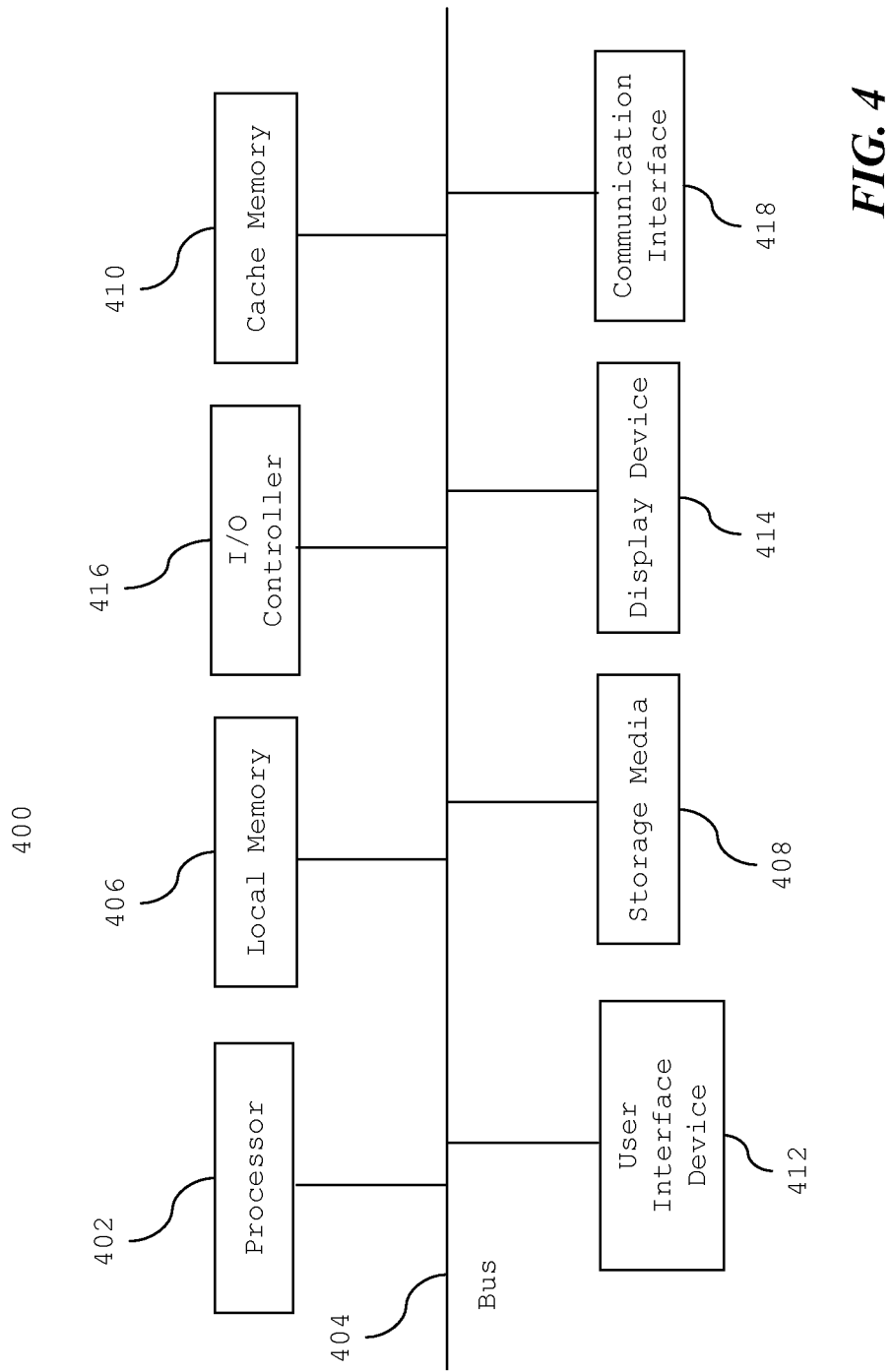
FIGS. 4 and 5 are block diagrams of hardware and software environments in which the disclosed systems and methods may operate, in accordance with one or more embodiments.
Figure 5:
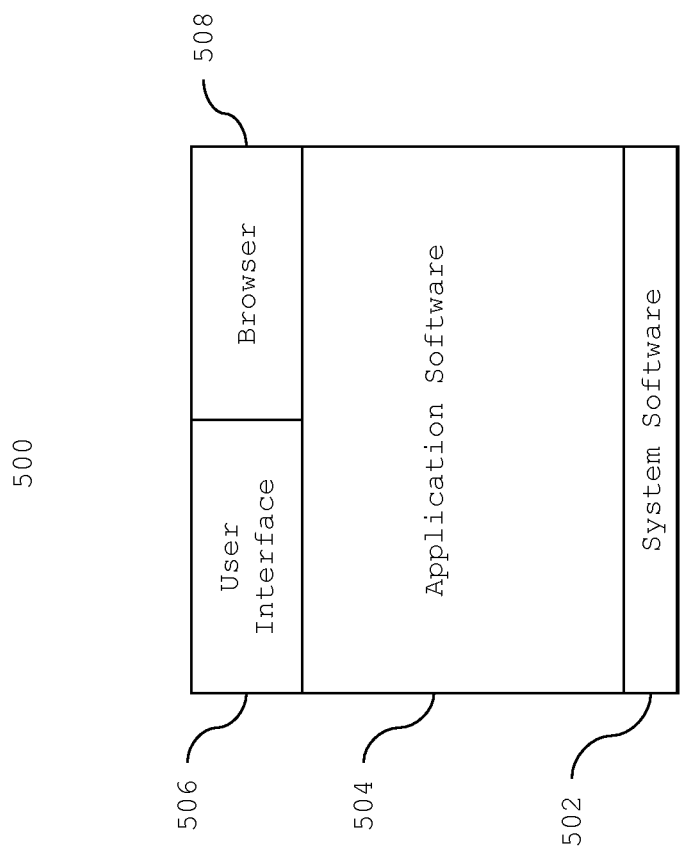

Referring to FIGS. 4 and 5, a computing system environment in accordance with an exemplary embodiment is composed of a hardware environment 400 and a software environment 500. The hardware environment 400 comprises the machinery and equipment that provide an execution environment for the software; and the software provides the execution instructions for the hardware as provided below.

As provided here, the software elements that are executed on the illustrated hardware elements are described in terms of specific logical/functional relationships. It should be noted, however, that the respective methods implemented in software may be also implemented in hardware by way of configured and programmed processors, ASICs (application specific integrated circuits), FPGAs (Field Programmable Gate Arrays) and DSPs (digital signal processors), for example.

Software environment 500 is divided into two major classes comprising system software 502 and application software 504. System software 502 comprises control programs, such as the operating system (OS) and information management systems that instruct the hardware how to function and process information.

In one embodiment, backup clients 116, 208, 210, applications 108, and snapshot frameworks 118, 204, 206 may be implemented as system software 502 or application software 504 executed on one or more hardware environments to facilitate a backup process as noted above. Application software 504 may comprise but is not limited to program code, data structures, firmware, resident software, microcode or any other form of information or routine that may be read, analyzed or executed by a microcontroller.

In an alternative embodiment, the invention may be implemented as computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate or transport the program for use by or in connection with the instruction execution system, apparatus or device.

The computer-readable medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and digital videodisk (DVD).

Referring to FIG. 4, an embodiment of the system software 502 and application software 504 can be implemented as computer software in the form of computer readable code executed on a data processing system such as hardware environment 400 that comprises a processor 402 coupled to one or more computer readable media or memory elements by way of a system bus 404. The computer readable media or the memory elements, for example, can comprise local memory 406, storage media 408, and cache memory 410. Processor 402 loads executable code from storage media 408 to local memory 406. Cache memory 410 provides temporary storage to reduce the number of times code is loaded from storage media 408 for execution.

A user interface device 412 (e.g., keyboard, pointing device, etc.) and a display screen 414 can be coupled to the computing system either directly or through an intervening I/O controller 416, for example. A communication interface unit 418, such as a network adapter, may be also coupled to the computing system to enable the data processing system to communicate with other data processing systems or remote printers or storage devices through intervening private or public networks. Wired or wireless modems and Ethernet cards are a few of the exemplary types of network adapters.

In one or more embodiments, hardware environment 400 may not include all the above components, or may comprise other components for additional functionality or utility. For example, hardware environment 400 may be a laptop computer or other portable computing device embodied in an embedded system such as a set-top box, a personal data assistant (PDA), a mobile communication unit (e.g., a wireless phone), or other similar hardware platforms that have information processing and/or data storage and communication capabilities.

In certain embodiments of the system, communication interface 418 communicates with other systems by sending and receiving electrical, electromagnetic or optical signals that carry digital data streams representing various types of information including program code. The communication may be established by way of a remote network (e.g., the Internet), or alternatively by way of transmission over a carrier wave.

Referring to FIGS. 2 and 5, system software 502 and application software 504 can comprise one or more computer programs that are executed on top of an operating system after being loaded from storage media 408 into local memory 406. In a client-server architecture, application software 504 may comprise client software and server software. For example, in one embodiment of the invention, client software is executed on virtual machines 104 and server software is executed on server systems 102, 114, 200, or 202.

Software environment 500 may also comprise browser software 508 for accessing data available over local or remote computing networks. Further, software environment 500 may comprise a user interface 506 (e.g., a Graphical User Interface (GUI)) for receiving user commands and data. Please note that the hardware and software architectures and environments described above are for purposes of example, and one or more embodiments of the invention may be implemented over any type of system architecture or processing environment.

It should also be understood that the logic code, programs, modules, processes, methods and the order in which the respective steps of each method are performed are purely exemplary. Depending on implementation, the steps may be performed in any order or in parallel, unless indicated otherwise in the present disclosure. Further, the logic code is not related, or limited to any particular programming language, and may comprise of one or more modules that execute on one or more processors in a distributed, non-distributed or multi-processing environment.

Therefore, it should be understood that the invention can be practiced with modification and alteration within the spirit and scope of the appended claims. The description is not intended to be exhaustive or to limit the invention to the precise form disclosed. These and various other adaptations and combinations of the embodiments disclosed are within the scope of the invention and are further defined by the claims and their full scope of equivalents.

What is claimed is:

1. A method of backing up one or more applications executing on a virtual machine, the method comprising:

preparing an application for backup in response to a first notification from a first system communicatively coupled to a second system on which one or more virtual machines are running, wherein the first system identifies a first virtual machine executing the application and provides the first notification to the first virtual machine to prepare the application for backup, such that application data consistency is maintained during the backup process;

wherein the second system comprises a virtualization server over which execution of one or more applications is supported, wherein said one or more applications are hosted by the one or more virtual machines running on the second system, and wherein the second system is independent of the first system over which a backup utility is executed to reduce system load on the second system for the purpose of maintaining functionality of backup procedures applied to the applications running on the second system;

providing a second notification from the second system to the first system, indicating that the application is prepared for backup, wherein the backup utility on the first system creates a snapshot of the first virtual machine in response to the second notification; and communicating the application data from the second system to the first system, wherein the backup utility on the first system utilizes the application data to process the snapshot and complete an application-specific backup for the first virtual machine, wherein the first system communicates with the first virtual machine on the second system via backup client software comprising a first software module locally installed on the first system and a second software module locally installed on the second system, wherein the first software module enables the first system to take a snapshot of a virtual machine running on the second system based on application-specific information communicated to the first software module from the second software module, wherein the first software module enables the first system to either (1) directly backup data associated with an application that runs on a virtual machine on the second system using snapshot data collected by a snapshot software locally running on the second system, or (2) communicate with a remotely located storage management system to backup the snapshot data in a remote backup storage medium so that load for processing backup data, associated with the application that runs on the virtual machine on the second system, is offloaded either to the first system or to the remotely located storage management system based on communications between the first software module and the second software module, wherein application data consistency is maintained during the backup process by temporarily switching the application into a halt state, and wherein in the halt state operations that alter the application data are blocked or terminated, without terminating the application.

2. The method of claim 1, wherein the first system is remotely coupled to the second system over a communications network.

3. The method of claim 1, wherein the first system identifies the first virtual machine executing the application by querying a third system communicatively coupled to the first system, wherein the third system provides information about one or more computing systems, and respective virtual machines running on each computing system.

4. The method of claim 1, further comprising preparing the application for backup by utilizing a backup framework locally installed on the first system, wherein the backup framework enables backing up the application data for applications running on the second system.

5. The method of claim 4, wherein the backup framework comprises Microsoft's® Volume Shadow Copy Service (VSS) framework.

6. The method of claim 1, wherein the first system creates a snapshot of the first virtual machine by utilizing a snapshot framework that enables taking a snapshot of the first virtual machine.

7. The method of claim 6, wherein the first system utilizes a VMware Consolidated Backup® (VCB) framework.

8. A computer program product comprising a non-transitory computer usable medium including logic code, wherein the logic code when execute by a computing system causes the computing system to:

prepare an application for backup in response to a first notification from a first system communicatively coupled to a second system on which one or more virtual machines are running, wherein the first system identifies a first virtual machine executing the application and provides the first notification to the first virtual machine to prepare the application for backup, such that application data consistency is maintained during the backup process, wherein the second system comprises a virtualization server over which execution of one or more applications is supported, wherein said one or more applications are hosted by the one or more virtual machines running on the second system, and wherein the second system is independent of the first system over which a backup utility is executed to reduce system load on the second system for the purpose of maintaining functionality of backup procedure;

provide a second notification from the second system to the first system, indicating that the application is prepared for backup, wherein the first system creates a snapshot of the first virtual machine in response to the second notification; and communicate the application data to the first system, wherein the first system utilizes the application data to process the snapshot and complete an application-specific backup for the first virtual machine;

wherein the first system communicates with the first virtual machine on the second system via backup client software comprising a first software module locally installed on the first system and a second software module locally installed on the second system, wherein the first software module enables the first system to take a snapshot of a virtual machine running on the second system based on application-specific information communicated to the first software module from the second software module, wherein the first software module enables the first system to either (1) directly backup data associated with an application that runs on a virtual machine on the second system using snapshot data collected by a snapshot software locally running on the second system, or (2) communicate with a remotely located storage management system to backup the snapshot data in a remote backup storage medium so that load for processing backup data associated with the application that runs on the virtual machine on the second system is offloaded to either the first system or the remotely located storage management system based on communications between the first software module and the second software module, wherein application data consistency is maintained during the backup process by temporarily switching the application into a halt state, and wherein in the halt state operations that alter the application data are blocked or terminated, without terminating the application.

9. The computer program product of claim 8, wherein the first system is remotely coupled to the second system over a communications network.

10. The computer program product of claim 8, wherein the first system identifies the first virtual machine executing the application by querying a third system communicatively coupled to the first system, wherein the third system provides information about one or more computing systems, and respective virtual machines running on each computing system.

11. The computer program product of claim 8, wherein execution of the logic code further causes the computing system to prepare the application for backup by utilizing a backup framework locally installed on the first system, wherein the backup framework enables backing up the application data.

12. The computer program product of claim 8, wherein the first system creates a snapshot of the first virtual machine by utilizing a snapshot framework that enables taking a snapshot of a the first virtual machine.

13. A backup system comprising:
memory for storing data;
a logic unit to submit a first notification to a remote computing system to prepare an application running on a virtual machine for backup, such that application data consistency is maintained during the backup process;
a logic unit to receive a second notification from the remote computing system, indicating that the application is prepared for backup;
a logic unit to create a snapshot of the virtual machine in response to the second notification; and
a logic unit to receive application data from the remote computing system to process the snapshot and complete an application-specific backup for the virtual machine,
wherein the remote computing system comprises a virtualization server over which execution of one or more applications is supported, wherein said one or more applications are hosted by the one or more virtual machines running on the remote computing system, and
wherein the backup system is a server independent of the remote computing system, and wherein a backup utility is executed on the backup system to reduce system load on the remote computing system for the purpose of maintaining functionality of backup procedure,
wherein the backup system communicates with the first virtual machine on the remote computing system via backup client software comprising a first software module locally installed on the backup system and a second software module locally installed on the remote computing system,
wherein the first software module enables the first system to take a snapshot of a virtual machine running on the second system based on application-specific information communicated to the first software module from the second software module,
wherein the first software module enables the first system to either (1) directly backup data associated with an application that runs on a virtual machine on the second system using snapshot data collected by a snapshot software locally running on the second system, or (2) communicate with a remotely located storage management system to backup the snapshot data in a remote backup storage medium so that load for processing backup data associated with the application that runs on the virtual machine on the second system is offloaded to either the first system or the remotely located storage management system, based on communications between the first software module and the second software module,
wherein application data consistency is maintained during the backup process by temporarily switching the application into a halt state, and
wherein in the halt state operations that alter the application data are blocked or terminated, without terminating the application.

14. The system of claim 13, further comprising:
a logic unit to communicate with the virtual machine on the remote computing system via backup client software comprising a first software module locally installed on the system and a second software module locally installed on the remote computing system,
wherein the first software module enables the system to take a snapshot of a virtual machine running on the remote computing system, and
wherein the second software module enables the remote computing system to backup data associated with an application that runs on a virtual machine on the remote computing system.

* * * * *